Patented Nov. 4, 1947

2,430,052

UNITED STATES PATENT OFFICE 2,430,052

PHTHALOCYANINE DERIVATIVES

Norman Hulton Haddock, William Owen Jones, Alexander Parkinson, and George Alston Rowe, Blackley, Manchester, England, assignors to Imperial Chemical Industries Limited, a corporation of Great Britain No Drawing. Application March 22, 1946, Serial No. 656,532. In Great Britain March 26, 1945

8 Claims. (Cl. 260—314.5)

This invention relates to the manufacture of new phthalocyanine derivatives, and more particularly it relates to phthalocyanines having aminoaryl groups attached to their aromatic nuclei through sulfur atoms.

It is known that tetra-aminophthalocyanines are readily diazotised and that colouring matters may be prepared by coupling the phthalocyanine diazonium salts so obtained, with azo coupling components. These phthalocyanine diazonium salts, in common with diazonium salts generally, are liable to decompose, particularly at raised temperatures and even at room temperature or 0° C. Consequently in coupling them decomposition tends to occur, the degree of decomposition depending especially on the temperature. The decomposition products thus arising are apt to contaminate the resulting azo colouring matter and so may impair its technically useful properties.

We have now found that if the amino groups, instead of being attached directly to the phthalocyanine molecule, are attached to pendant aryl nuclei which are connected to the phthalocyanine nuclei through sulfur as a linking atom, then the stability of the corresponding diazonium salts is increased.

According to the present invention we provide a process for the manufacture of new phthalocyanine derivatives of the formula

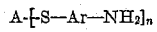

wherein A is a metal or metal-free phthalocyanine nucleus, Ar is a substituted or unsubstituted arylene nucleus, $n$ is a whole number not exceeding 4, which comprises reducing compounds of the formula

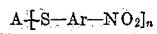

wherein A, Ar, and $n$ have the significance given above, by conventional methods.

The arylene nucleus in the above formula may be, for example, $-C_6H_4-$, $-C_6H_3.CH_3-$ or $-C_{10}H_6-$.

As said, A is a metal or metal-free phthalocyanine nucleus. When $n$ is less than 4, that is when one or more of the benzene nuclei of the phthalocyanine nucleus is free from $-SArNO_2$ radicals then A may if desired carry in these nuclei substituents other than $-SArNO_2$ radicals for example chlorine atoms, or phenyl or benzoyl groups.

When $n$ in the above formulae is greater than 1, the Ar's may be respectively identical or different in the several $SArNO_2$ or $SArNH_2$ groups.

Suitable starting materials for the manufacture of the new compounds include for example copper tetra-4-(p-nitrophenylmercapto)-phthalocyanine, obtainable by the interaction of 4-(p-nitrophenylmercapto)-phthalic anhydride with urea and cupric chloride in presence of ammonium molybdate and boric acid in monochloronaphthalene as diluent. The 4-(p-nitrophenylmercapto)-phthalic anhydride is obtainable by condensing p-chloronitrobenzene with the tripotassium salt of 4-mercaptophthalic acid, and crystallising the condensation product from acetic anhydride).

The reduction process of the invention may be carried out as said by conventional methods. Thus there may be used as reducing agents for example those of the alkali sulphide class, including for example sodium sulphide, sodium hydrogen sulphide and the sodium polysulphides, alkali sulphites or bisulphites, alkali hydrosulphites, tin or zinc or stannous chloride and acid.

The new phthalocyanine derivatives consist of blue or green powders which may be diazotised and the so-obtained diazonium salts used as diazo components for the manufacture of new dyestuffs, by coupling them with the conventional coupling components. For this purpose it is convenient to use the new phthalocyanine derivatives in the form of aqueous pastes.

The invention is illustrated but not limited by the following examples in which the parts are by weight:

Example 1

32 parts of copper tetra-4-(p-nitrophenylmercapto)-phthalocyanine (obatined as described below) are dissolved in 320 parts of concentrated sulphuric acid at 10° C., and the green solution so obtained is added dropwise to 3200 parts of vigorously stirred cold water. The resulting green suspension is filtered and the filter cake is washed with water until free from acid and from inorganic salts. The filter cake is stirred into 100 parts of water and the suspension is added to 300 parts of 30% aqueous sodium hydrogen sulphide solution. This mixture is stirred at 95°–100° C. during 4 hours, then allowed to cool and ball-milled during 12 hours. The suspended solid is filtered off and the green filter cake is washed with water until free from alkali and from sulphide ions. It may be dried to give a green solid but is conveniently kept as an aqueous paste for use.

The copper tetra-4-(p-nitrophenylmercapto) phthalocyanine used in the above example may be obtained as follows:

40 parts of 4-(p-nitrophenylmercapto) phthalic anhydride (obtained by reacting p-chloronitrobenzene with the tripotassium salt of 4-mercaptophthalic acid and recrystallising the so-obtained 4-(p-nitrophenylmercapto) phthalic acid from acetic anhydride), 120 parts of urea, 6.7 parts of anhydrous cupric chloride, 0.85 part of ammonium molybdate and 1.7 parts of boric acid are mixed and ground to a fine powder. The mixture is added to 288 parts of α-chloronaphthalene and the suspension is stirred and heated to 115–120° C., the temperature being so maintained until the green colour of the melt disappears. The temperature is then raised to 136° C. and so maintained during 2.5 hours. The mixture is then allowed to cool and is filtered and the residual solid is washed with benzene until free from α-chloronaphthalene. It is then extracted successively with boiling ethanol, boiling water, 2 N hydrochloric acid at 90° C., 2 N sodium hydroxide solution at 90° C., boiling water and again with ethanol. The product is then filered off and dried. It is believed to have the following structure:

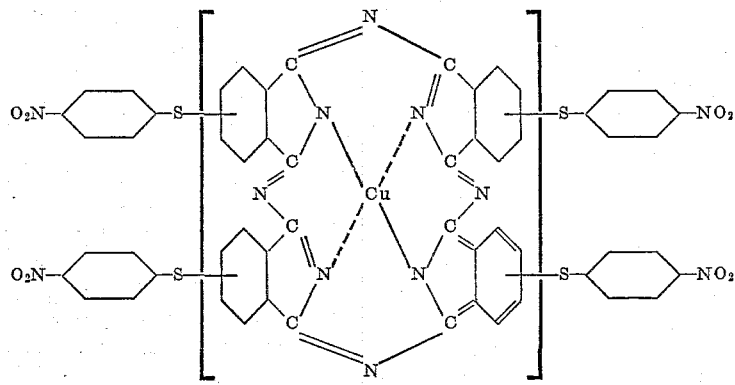

*Example 2*

30 parts of copper 3:6:3′:6′-tetrachloro-4″:4‴ - di(p - nitrophenylmercapto) phthalocyanine (obtained as described below) are dissolved in 300 parts of concentrated sulphuric acid at 0°–10° C., and the green solution so obtained is added slowly to 3000 parts of water, which is vigorously stirred. The green suspension so obtained is filtered and the filter-cake is washed with water until it is free from acid and inorganic salts. The filter cake is mixed with 250 parts of a 30% aqueous solution of sodium hydrogen sulphide and the mixture is milled for 12–16 hours and then stirred at 95°–100° C. for 2 hours. The mixture is cooled and filtered and the green filter cake is washed with water until it is free from alkali and sulphide ions. The product may be dried to give a green solid, but is more conveniently kept as an aqueous paste, for the purpose of diazotisation.

The copper 3:6:3′:6′-tetrachloro-4″:4‴-di-(p-nitrophenylmercapto) phthalocyanine used above may be obtained as follows:

30 parts of 4-(p-nitrophenylmercapto) phthalic anhydride, 21.7 parts of 3:6-dichlorophthalic anhydride, 180 parts of urea, 10.1 parts of anhydrous cupric chloride, 1.2 parts of ammonium molybdate, and 2.4 parts of boric acid are mixed and ground to a fine powder. The mixture is added to 216 parts of α-chloronaphthalene, the suspension is heated to 120° C. during 30 minutes, and stirred at this temperature for 1 hour. The mixture is then heated to 140° C. and stirred at this temperature for 2½ hours. The mixture is cooled, and filtered and the residue is washed with benzene and extracted successively with boiling ethanol, boiling water, 2 N hydrochloric acid at 90° C., 2 N sodium hydroxide solution at 90° C., boiling water and again with ethanol. The product is then filtered off and dried.

*Example 3*

30 parts of copper 3:6-dichloro-4′:4″:4‴-tri-(p-nitrophenylmercapto)phthalocyanine are dissolved in 300 parts of concentrated sulphuric acid, the solution poured into 3000 parts of cold water. The suspension is filtered and the filter-cake washed until it is free from acid and inorganic salts. The green filter-cake is then reduced with 250 parts of a 30% aqueous solution of sodium hydrogen sulphide, and isolated as described in Example 4. The product may be dried to form a green solid but is conveniently kept as an aqueous paste for the purpose of diazotisation.

The copper 3:6-dichloro-4′:4″:4‴-tri-(p-nitrophenylmercapto)phthalocyanine used above may be obtained as follows: 30 parts of 4-(p-nitrophenylmercapto)-phthalic anhydride, 7.2 parts of 3:6-dichlorophthalic anhydride, 120 parts of urea, 6.7 parts of anhydrous cupric chloride, 0.8 part of ammonium molybdate, and 1.6 parts of boric acid are mixed and ground to a fine powder and the powder is added to 216 parts of α-chloronaphthalene. The mixture is heated to 120° C. for 30 minutes and stirred at this temperature for 1 hour. The mixture is then heated to 140°, stirred at this temperature for 2½ hours, cooled and filtered and the residue is washed with benzene and extracted successively with boiling ethanol, boiling water, 2 N hydrochloric acid at 90° C., 2 N caustic soda at 90° C., boiling water and again with ethanol. The product is then filtered off and dried.

*Example 4*

18 parts of copper tetra-4-(o-nitrophenylmercapto)-phthalocyanine are dissolved in 180 parts of concentrated sulphuric acid at 0°–10° C. The bright green solution so obtained is added dropwise to 1800 parts of vigorously stirred cold water. The resulting green suspension is filtered and the residue is washed with cold water until it is free from acid and inorganic salts. The filter cake is then added to 200 parts of a 30% aqueous solution of sodium hydrogen sulphide and the mixture is then milled for 12–16 hours and stirred at 95°–100° C. during 2 hours. The suspension is cooled and filtered, and the residue is washed with water until it is free from alkali and sulphide ions, The product may be dried to give a bright green solid but is conveniently kept as an aqueous paste.

The copper tetra-4-(o-nitrophenylmercapto)-phthalocyanine used in this example may be obtained as follows:

35 parts of 4-(o-nitrophenylmercapto)phthalic anhydride (obtained by condensing o-chloronitrobenzene with the tripotassium salt of 4-mercaptophthalic acid, and crystallising the product obtained from acetic anhydride), 105 parts of urea, 5.9 parts of cupric chloride, 0.75 part of ammonium molybdate and 1.5 parts of boric acid are finely ground together and added to 252 parts of α-chloronaphthalene. The mixture is stirred and heated to 120° C. during 30 minutes and stirred at this temperature during 1 hour. The mixture is then heated to 140° C. and stirred at this temperature during 2.5 hours. The mixture is cooled and filtered and the residue is washed with benzene until it is free from α-chloronaphthalene. The product is then successively extracted with boiling ethanol, boiling water, 2 N hydrochloric acid at 90° C., 2 N sodium hydroxide solution at 90° C., boiling water and again with boiling ethanol. The product is then filtered and dried to give a bright green powder.

*Example 5*

20 parts of copper tetra-4-(4'-nitro-3'-methylphenylmercapto)phthalocyanine are dissolved in 200 parts of concentrated sulphuric acid at 0°-10° C. The green solution is added, dropwise, to 2000 parts of water. The bright green suspension so obtained is filtered, and the residue washed well with cold water until it is free from acid and inorganic salts. The residue is then added to 200 parts of a 30% aqueous solution of sodium hydrogen sulphide and the resulting mixture is ballmilled during 12–16 hours and then stirred at 95°–100° C. during 2 hours. The mixture is cooled and filtered off, and the residue washed well with cold water until it is free from alkali and sulphide ions. The copper tetra-4-(4'-amino-3'-methylphenylmercapto)-phthalocyanine may be dried to form a bright green solid but is more conveniently kept as an aqueous suspension for the purpose of diazotisation.

The copper tetra-4-(4'-nitro-3'-methylphenylmercapto)-phthalocyanine used in this example may be obtained in the following manner:

40 parts of 4-(4'-nitro-3'-methylphenylmercapto)phthalic anhydride (obtained by condensing 5-chloro-2-nitrotoluene with the tripotassium salt of 4-mercaptophthalic acid and recrystallising the product from acetic anhydride), 114 parts of urea, 6.4 parts of anhydrous cupric chloride, 0.8 part of ammonium molybdate, and 1.6 parts of boric acid are mixed and ground to a fine powder and added to 288 parts of α-chloronaphthalene. The mixture is heated and the product isolated in a similar manner to that described for the preparation of copper tetra-4-(o-nitrophenylmercapto)phthalocyanine in Example 4. The copper tetra-4-(4'-nitro-3'-methylphenylmercapto)phthalocyanine is obtained as a bright green powder.

*Example 6*

10 parts of copper tetra-4-(4'-nitro-2':5'-dimethoxyphenylmercapto)phthalocyanine are dissolved in 100 parts of concentrated sulphuric acid and the solution added, dropwise, to 1000 parts of cold water. The bright green suspension so obtained is filtered off, and the residue washed well with cold water until free from acid and mineral salts. The residue is then added to a solution of 38 parts of stannous chloride dihydrate in a mixture of 65 parts of water and 76 parts of concentrated hydrochloric acid, and the resulting mixture is ballmilled for 12 hours. The suspension is filtered and the residue washed well with dilute hydrochloric acid until free from tin salts, then washed well with water, then with dilute aqueous ammonia and finally with water until free from alkali. The product so obtained may be dried to form a bright green powder, but is more conveniently kept as an aqueous paste for the purpose of diazotisation.

The copper tetra-4-(4'-nitro-2':5'-dimethoxyphenylmercapto)phthalocyanine used in this example may be obtained in the following manner:

40 parts of 4-(4'-nitro-2':5'-dimethoxyphenylmercapto)-phthalic anhydride (obtained by condensing 4-bromo-2:5-dimethoxy nitrobenzene with the tripotassium salt of 4-mercaptophthalic acid and crystallising the product so obtained from acetic anhydride), 100 parts of urea, 5.6 parts of anhydrous cupric chloride, 1.5 parts of boric acid and 0.75 part of ammonium molybdate are mixed and ground to a fine powder and added to 288 parts of α-chloronaphthalene. The mixture is heated and the product isolated in a similar manner to that described for the preparation of copper tetra-4-(o-nitrophenylmercapto)-phthalocyanine in Example 4. The product so obtained is a bright green solid.

In the claims below, the expressions "fundamental radical of a metal phthalocyanine" and "fundamental phthalocyanine complex" shall be understood as referring to the principal phthalocyanine complex which comprises the central metal atom, the principal 8 N-atoms, and the four principal phenylene nuclei; in other words, taking as an illustration the compound formed in Example 1 above, the fundamental phthalocyanine complex refers to that portion of the molecule which is included in the brackets in the formula set forth in Example 1.

We claim:

1. A compound of the general formula Q—[S—Ar—Y]$_n$, wherein Q stands for the fundamental radical of a metal phthalocyanine, Ar stands for an arylene radical whose cyclic structure contains not more than 10 carbon atoms, Y designates a radical of the group consisting of nitro and amino, while $n$ is a positive integer not greater than 4.

2. A compound of the general formula Q—[S—Ar—NH$_2$]$_n$, wherein Q stands for the fundamental radical of a metal phthalocyanine, Ar stands for an arylene radical whose cyclic structure contains not more than 10 carbon atoms, and $n$ designates a positive integer not greater than 4.

3. A compound of the general formula

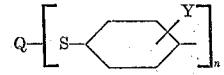

wherein Q stands for the fundamental radical of a metal phthalocyanine, Y designates a radical of the group consisting of nitro and amino, while $n$ is a positive integer not greater than 4.

4. A compound of the general formula

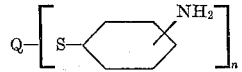

wherein Q stands for the fundamental radical of a metal phthalocyanine and $n$ designates a positive integer not greater than 4.

5. A copper phthalocyanine compound characterized by carrying in at least one of the phenylene nuclei of the fundamental phthalocyanine complex an amino-phenyl-mercapto substituent.

6. Copper tetra-(p-amino-phenyl-mercapto)-phthalocyanine.

7. Copper tetra-(4'-amino-3'-methyl-phenyl-mercapto)-phthalocyanine.

8. Copper-3,6-dichloro-4', 4'', 4'''-tri-(p-amino-phenyl-mercapto)-phthalocyanine.

NORMAN HULTON HADDOCK.
WILLIAM OWEN JONES.
ALEXANDER PARKINSON.
GEORGE ALSTON ROWE.

REFERENCES CITED

The following references are of record in the file of this patent:

FOREIGN PATENTS

| Number | Country | Date |
|---|---|---|
| 569,200 | Great Britain | May 11, 1945 |